(12) United States Patent
Mecane (10) Patent No.: US 10,529,021 B2
(45) Date of Patent: Jan. 7, 2020

(54) RETAIL AGGREGATOR APPARATUSES, METHODS AND SYSTEMS

(71) Applicant: NYSE Group, Inc., New York, NY (US)

(72) Inventor: Joseph Mecane, Rye, NY (US)

(73) Assignee: NYSE Group, Inc., New York, NY (US)

( * ) Notice: Subject to any disclaimer, the term of this patent is extended or adjusted under 35 U.S.C. 154(b) by 0 days.

(21) Appl. No.: 14/663,133

(22) Filed: Mar. 19, 2015

(65) Prior Publication Data

US 2015/0193877 A1    Jul. 9, 2015

Related U.S. Application Data

(60) Division of application No. 13/691,686, filed on Nov. 30, 2012, which is a continuation of application No. 13/649,034, filed on Oct. 10, 2012, now abandoned.

(60) Provisional application No. 61/545,511, filed on Oct. 10, 2011.

(51) Int. Cl.
*G06Q 40/04*    (2012.01)

(52) U.S. Cl.
CPC .................. *G06Q 40/04* (2013.01)

(58) Field of Classification Search
CPC ........ G06Q 40/04; G06Q 40/00; G06Q 40/06; G06Q 30/08; G06Q 10/087; G06Q 30/0601; G06Q 20/20; G06Q 30/0268
See application file for complete search history.

(56) References Cited

U.S. PATENT DOCUMENTS

| 7,660,761 | B2 * | 2/2010 | Zhou | G06Q 40/00 705/35 |
| 7,680,722 | B2 * | 3/2010 | Bok | G06Q 40/00 705/36 R |
| 7,865,421 | B2 * | 1/2011 | Schoen | G06Q 40/00 705/35 |
| 7,941,364 | B2 * | 5/2011 | Peterffy | G06Q 30/0601 705/38 |

(Continued)

FOREIGN PATENT DOCUMENTS

| EP | 1 630 741 A1 | 3/2006 |
| WO | 01/04817 A1 | 1/2001 |

(Continued)

OTHER PUBLICATIONS

Gomber et al.: Algorithmic Trading Engines Versus Human Traders—Do they behave different in securities markets?, Apr. 2009, Center for Financial Studies, Frankfurt, Deutschland, pp. 1-15.*

(Continued)

*Primary Examiner* — Bijendra K Shrestha
(74) *Attorney, Agent, or Firm* — DLA Piper LLP (US)

(57) ABSTRACT

Systems and methods for facilitating retail price improvement of a security order. The systems and methods may include receiving at an exchange, using a processor, a retail order to buy or sell a security; receiving at the exchange, using a processor, a contra-side non-displayed order for the security, wherein the contra-side non-displayed order has an improved price relative to a benchmark; and filling, using a processor, at least a portion of the retail order at the improved price using the contra-side non-displayed order.

13 Claims, 5 Drawing Sheets

(56) References Cited

U.S. PATENT DOCUMENTS

| | | | | |
|---|---|---|---|---|
| 7,996,261 | B1* | 8/2011 | Waelbroeck et al. | 705/14.1 |
| 8,082,204 | B2* | 12/2011 | Mittal | G06Q 40/06 36/40 |
| 8,306,904 | B1* | 11/2012 | Marchini | G06Q 40/04 705/37 |
| 8,396,904 | B2 | 3/2013 | Ylonen | |
| 2002/0010672 | A1* | 1/2002 | Waelbroeck et al. | 705/37 |
| 2003/0177086 | A1* | 9/2003 | Gomber | G06Q 40/04 705/37 |
| 2004/0236662 | A1* | 11/2004 | Korhammer | G06Q 40/04 705/37 |
| 2005/0171890 | A1* | 8/2005 | Daley | G06Q 30/08 705/37 |
| 2005/0240510 | A1* | 10/2005 | Schweickert | G06Q 40/04 705/37 |
| 2006/0253379 | A1* | 11/2006 | Adcock | G06Q 40/04 705/37 |
| 2007/0078753 | A1* | 4/2007 | Cormack | G06Q 30/08 705/37 |
| 2009/0018949 | A1* | 1/2009 | Waelbroeck | G06Q 30/0601 705/37 |
| 2009/0125431 | A1* | 5/2009 | Armstrong | G06Q 30/06 705/37 |
| 2009/0241174 | A1* | 9/2009 | Rajan | G06F 21/31 726/5 |
| 2010/0250424 | A1* | 9/2010 | Torres | 705/37 |
| 2010/0259424 | A1 | 10/2010 | Wang et al. | |
| 2010/0268638 | A1* | 10/2010 | Wunsch | G06Q 30/0633 705/37 |
| 2010/0298638 | A1* | 11/2010 | Slater | 600/106 |
| 2011/0178914 | A1* | 7/2011 | Waelbroeck et al. | 705/37 |

FOREIGN PATENT DOCUMENTS

| | | | | |
|---|---|---|---|---|
| WO | WO 01/04817 | * | 1/2001 | G06F 17/60 |
| WO | 01/22339 A2 | | 3/2001 | |
| WO | 2006 121691 A2 | | 11/2006 | |
| WO | WO-2006121691 A2 | * | 11/2006 | G06Q 40/04 |
| WO | WO-2009070337 A1 | * | 6/2009 | G06Q 40/04 |

OTHER PUBLICATIONS

Gomber et al.: Algorithmic Trading Engines Versus Human Traders—Do They Behave Different in Securities Markets, Apr. 2009, Center for Financial Studies (CFS), CFS Working Paper No. 2009/10, pp. 1-15.*

Chaboud et al.: Rise of the Machines: Algorithmic Trading in Foreign Exchange Market, Oct. 2009, Board of Governors of Federal Reserve System, International Finance Discussion Papers, No. 980, pp. 1-51. (Year: 2009).*

Gomber et al.: Arithmetic Trading Engines Versus Human Traders—Do they behave different in securities markets? Apr. 2009, Center for Financial Studies (CFS), pp. 1-15. (Year: 2009).*

Katz, Gary, "The Case for Protecting the Options Markets from Internalization," 2010, WFE, pp. 1-2.

Chaboud et al.: Rise of Machines: Algorithmic Trading in the Foreign Exchange Market, Oct. 2009, Board of Governors of The Federal Reserve System, pp. 1-51.

MacKenzie, D.: How to Make Money in Microseconds, May 19, 2011: London Review of Books, vol. 33, No. 10, pp. 1-11.

* cited by examiner

RETAIL AGGREGATOR APPARATUSES, METHODS AND SYSTEMS

This application may contain material that is subject to copyright or other intellectual property protection. The respective owners of such intellectual property have no objection to the facsimile reproduction of the disclosure by anyone as it appears in published Patent Office files, but otherwise reserve all rights whatsoever.

TECHNICAL FIELD

The present innovations are directed generally to financial instrument transactions, and more particularly, to RETAIL AGGREGATOR APPARATUSES, METHODS, AND SYSTEMS (hereinafter, "Retail Aggregator").

BACKGROUND

Securities exchanges facilitate trading of various financial instruments such as stocks, bonds, and other securities such as unit trusts, exchange-traded funds, exchange-traded derivatives, Intellidexes, options and other financial instruments. A securities exchange may provide price information regarding financial instruments that trade on the securities exchange to facilitate trading of the financial instruments.

SUMMARY

In one exemplary embodiment, the Retail Aggregator includes a processor-implemented method for facilitating retail price improvement of a security order. The method includes receiving at an exchange, using a processor, a retail order to buy or sell a security; receiving at the exchange, using a processor, a contra-side non-displayed order for the security, wherein the contra-side non-displayed order has an improved price relative to a benchmark; and filling, using a processor, at least a portion of the retail order at the improved price using the contra-side non-displayed order.

In another exemplary embodiment, the Retail Aggregator is configured to facilitate retail price improvement of a security order, and includes a retail order module configured to receive a retail order to buy or sell a security; a contra-side module configured to receive a contra-side non-displayed order for the security, wherein the contra-side non-displayed order has an improved price relative to a benchmark; and a matching engine, configured to fill at least a portion of the retail order at the improved price using the contra-side non-displayed order.

In yet another exemplary embodiment, the Retail Aggregator includes a machine-readable, tangible medium storing processor-issuable instructions to: receive a retail order to buy or sell a security; receive a contra-side non-displayed order for the security, wherein the contra-side non-displayed order has an improved price relative to a benchmark; and fill at least a portion of the retail order at the improved price using the contra-side non-displayed order.

BRIEF DESCRIPTION OF THE DRAWINGS

The accompanying drawings illustrate various non-limiting, example, innovative aspects in accordance with the present descriptions.

DETAILED DESCRIPTION

Introduction

Although the embodiments discussed in this disclosure focus on facilitating better prices for retail investors on a stock exchange, it should be understood that the apparatuses, methods, and systems described may also be applied to other types of price improvement, including price improvement for institutional investors or other types or segments of market participants or investors, for all types of exchanges. The Retail Aggregator facilitates better prices for retail investors by allowing certain investors (e.g., liquidity providers or market makers) to place non-displayed orders for a security that may have an improved price relative to some benchmark (e.g., National Best Bid and Offer (NBBO)). The Retail Aggregator may include multiple competing liquidity providers. Liquidity providers may be willing to provide better prices if they know the general type of counterparty they are trading against. For example, retail order flow may be more desirable to trade against than other order flows (e.g., high-frequency trading algorithms), and a liquidity provider may be willing to provide a better price to a retail investor. Counterparties to such non-displayed security orders may receive a better price in a number of ways. For example, such non-displayed orders may have a guaranteed price improvement over NBBO. In another example, a counterparty to a non-displayed order may receive a rebate and/or be charged an access fee. To ensure the integrity of the Retail Aggregator and/or to prevent abuse, an order placed with the Retail Aggregator may be analyzed and/or verified to ensure that the order is, for example, a retail order.

In one embodiment, the Retail Aggregator allows differentiation in an exchange environment that may permit retail investors to receive better prices than they would receive through bilateral internalization arrangements. While bilateral internalization relationships may produce high levels of differentiation and customization, because the Retail Aggregator may include multiple and diverse competing liquidity providers, it may provide transparency and competitiveness on an exchange market that may outweigh structural frictions and result in better prices for retail investors. By providing price improvement for retail orders within an exchange environment, the Retail Aggregator may increase efficiency, reduce latency, afford investors new economic incentives, and produce greater transparency, liquidity, and competition throughout the marketplace.

Retail Aggregator

Figure 1:
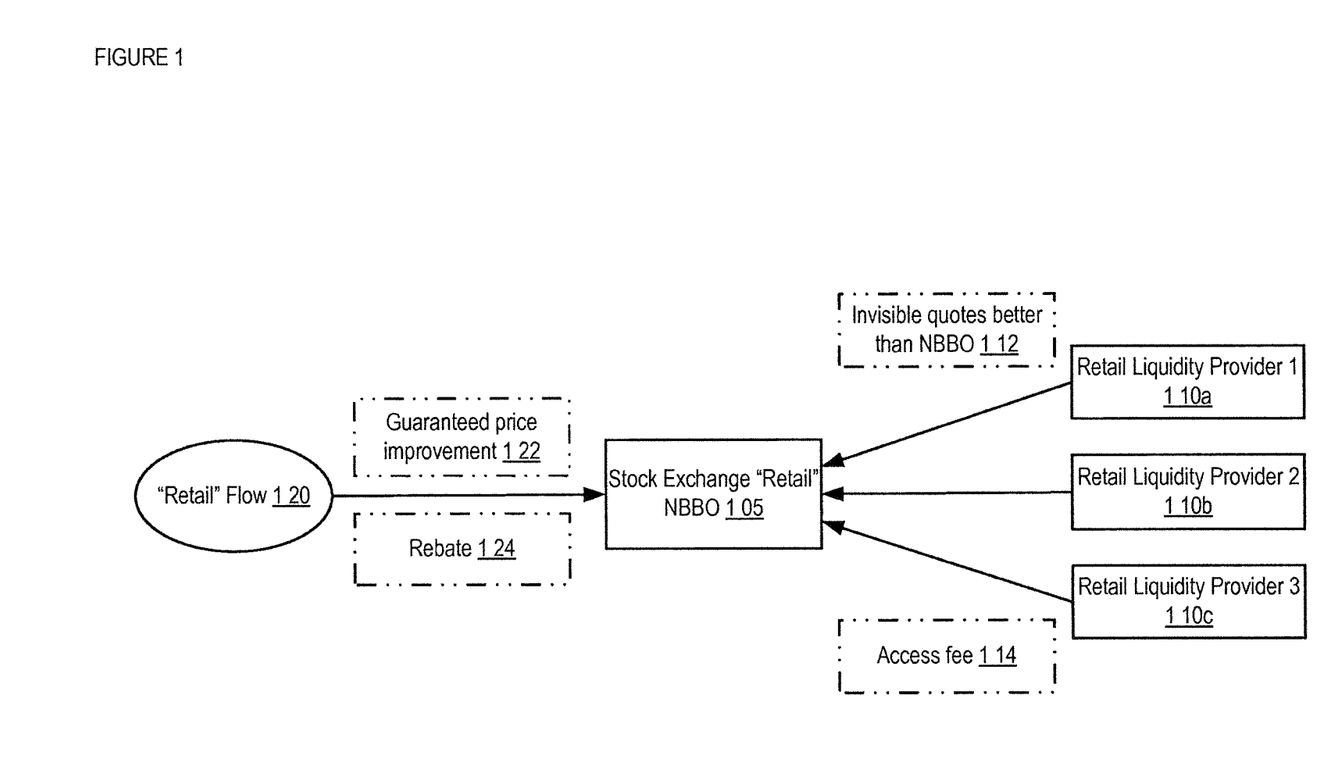
FIG. 1 shows a block diagram of an exemplary Retail Aggregator usage scenario according to one embodiment of the Retail Aggregator.

FIG. 1 shows a block diagram of an exemplary Retail Aggregator usage scenario in one embodiment of the Retail Aggregator. In FIG. 1, a stock exchange 105 (e.g., NYSE Euronext) may facilitate retail orders. Retail orders may be submitted by Retail Member Organizations (RMOs), such as brokers, on behalf of retail investors (e.g., customers). The stock exchange may also provide retail investors with bid and/or ask prices of securities traded on the stock exchange. For example, such bid and/or ask prices may be used to determine benchmarks such as National Best Bid and Offer (NBBO), New York Stock Exchange Best Bid and Offer (NYSE BBO), or any other suitable benchmark.

The stock exchange 105 may designate certain investors as Retail Liquidity Providers (RLPs) 11oa-c. RLPs may be allowed to place Retail Price Improvement Orders (RPIOs), which are non-displayed price-improvement orders for a security. RPIOs may be orders where the price and quantity of the orders are not publicly displayed, although there may be a publicly displayed indicator of available liquidity that is better than a benchmark. In some embodiments, member organizations (e.g., brokers) other than RLPs may be permitted to submit RPIOs. In other embodiments, any entity may submit RPIOs. The stock exchange 105 may specify at 112 that such RPIOs may have to have an improved price, for example, relative to predetermined benchmark. For example, the price of the RPIOs may be required to be at least 0.001 units per share better than the benchmark. In one exemplary embodiment, RPIOs on a stock exchange may be required to have a price that is better than the NBBO for a stock by at least $0.001. The stock exchange may also charge an access fee at 114. In one exemplary embodiment, a stock exchange may charge a fee of $0.0011 per share to RLPs for submitting RPIOs, although other suitable fees may also be charged, or suitable rebates given. In some embodiments, the stock exchange may charge member organizations other than RLPs a different access fee for submitting RPIOs (e.g., $0.0021 per share). If an RLP fails to satisfy RLP requirements, the RLP may be subject to disqualification as an RLP and/or subject to transaction pricing applicable to non-RLPs. In one embodiment, a retail order from the retail order flow 120 may be executed with contraside RPIOs. In another embodiment, a retail order (e.g., an immediate order, a cancel order, or any other suitable order) may, depending on the customer's instructions, (1) interact with RLP interest, or (2) interact with RLP interest and then the displayed and non-displayed interest on the stock exchange (e.g., NYSE), or (3) interact with RLP interest, then the displayed and non-displayed interest on the stock exchange and then route to other market centers. The customer and/or the RMO that placed the retail order may be guaranteed a price improvement at 122 (e.g., price improvement of at least $0.001 per share). The customer and/or the RMO that placed the retail order may also receive a rebate at 124 (e.g., $0.001 per share) or be charged an access fee. In one exemplary embodiment, the RLP may also receive a rebate. If an order submitted by a RMO is designated as a retail order but is determined to be a non-retail order, the RMO may be subject to disqualification as an RMO and/or subject to transaction pricing applicable to non-RMOs.

In one embodiment, an RMO may be required to have written policies and procedures reasonably designed to ensure that it will only designate orders as retail orders if all requirements of a retail order are met. For example, the RMO may be required to show that such written policies and procedures require the RMO to (i) exercise due diligence before entering a retail order to assure that entry as a retail order complies with applicable laws, rules, and regulations, and (ii) conduct periodic monitoring to ensure that orders entered as retail orders continue to meet the applicable requirements.

In another embodiment, if the RMO represents retail orders from another broker-dealer customer, the RMO may be required to ensure that the orders it receives from such broker-dealer customer that it designates as retail orders meet the definition of a retail order. For example, the RMO may be required to get a written representation, in a form acceptable to the stock exchange, from each broker-dealer customer that sends the RMO orders to be designated as retail orders, that entry of such orders as retail orders would be in compliance with all applicable laws, rules, and regulations. In another embodiment, the RMO may be required to conduct periodic assessments to monitor whether the retail order flow from its broker-dealer customers continues to meet the applicable requirements.

Figure 2:
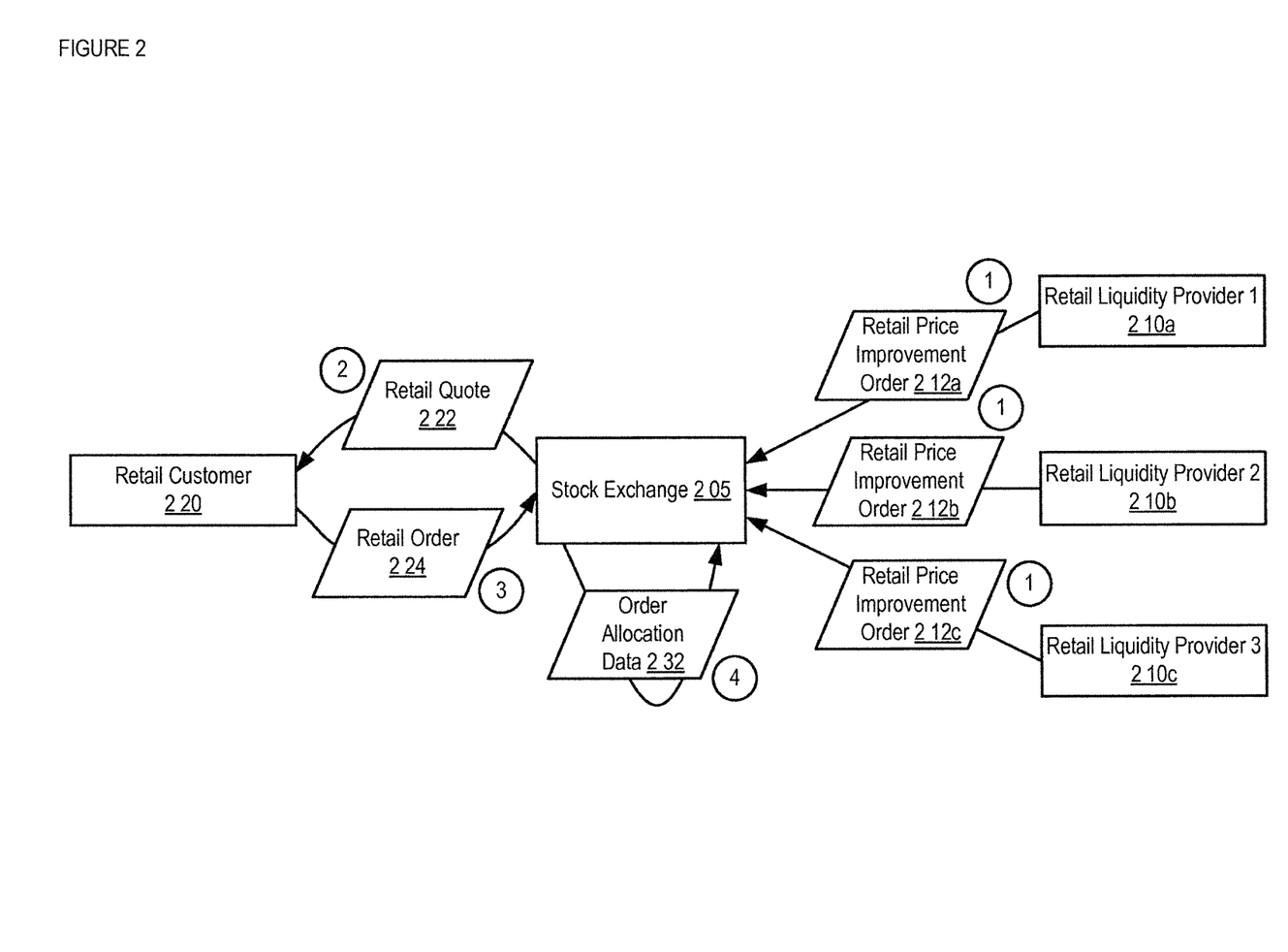
FIG. 2 shows a data flow diagram according to one embodiment of the Retail Aggregator.

FIG. 2 shows a data flow diagram in one embodiment of the Retail Aggregator. In FIG. 2, RLPs 21oa-c may wish to place RPIOs 212a-c via the stock exchange 205. In various embodiments, RPIOs may be placed via ArcaDirect API, Financial Information eXchange (FIX) API, Common Customer Gateway (CCG), Specialist Application Programmed Interface (SAPI), and other gateways and/or interfaces. For example, RPIOs may be placed via FIX using FIX messages substantially in the following form:

```
8=FIX.5.0|9=130|35=D|49=RLP1|56=Exchange|34=
    100|11=Order1|55=XYZ|54=1|52=20110602-12:
    12:12|60=20110602-12:12:
    12|38=500|40=RPIO|10=101
```

In the above message, a number on the left side of an equal sign represents a field and fields are separated by a "|" symbol. The numbers in the above message correspond to the following fields: BeginString(8), BodyLength(9), MsgType(35), SenderCompID(49), TargetCompID(56), MsgSeqNum(34), ClOrdID(11), Symbol(55), Side(54), SendingTime(52), TransactTime(60), OrderQty(38), OrdType(40), CheckSum(10). The above message indicates that it is in FIX 5.0 format, it is sent from RLP1 to the stock exchange, and it is an RPIO order to buy 500 shares of stock XYZ.

The stock exchange 205 may provide a stock quote 222 for a retail customer 220. In one embodiment, the stock exchange may provide the stock quote through an intermediary (e.g., through a broker's website). In another embodiment, the stock exchange may provide the stock quote directly to the retail customer. For example, the stock exchange may provide the stock quote in XML format substantially in the following form:

```
<XML>
    <Quote>
        <InstrumentType>Equity</InstrumentType>
        <Symbol>XYZ</Symbol>
        <BidPrice>$10.00</BidPrice>
        <AskPrice>$10.05</AskPrice>
        <LastTradePrice>$10.03</LastTradePrice>
        <LastTradeSize>200 Shares</LastTradeSize>
        <LastTradeTime>20110602-12:12:12</LastTradeTime>
        <RPIO>Available</RPIO>
    </Quote>
</XML>
```

In one embodiment, the stock quote may include an indicator of whether an RLP has RPIOs or other non-displayed orders outstanding for the stock (e.g., indicated by <RPIO>"Available"</RPIO> in the XML example above). In another exemplary embodiment, the indicator of the availability of RPIOs or other non-displayed orders may be provided separately to the customer, as a separate data feed, for example. The indicator may be publicly displayed or publicly accessible through a website or through other suitable means. In one exemplary embodiment of the Retail Aggregator, a display module configured to display a publicly accessible quote for the security may display the quote along with the indicator of the availability of one or more RPIOs or other non-displayed orders for the security. For example, the stock quote may indicate that there is an RPIO for the stock, but may omit the price, side, and/or the size of the order. In one exemplary embodiment, the stock quote may be a publicly accessible stock quote, available through a website or through other means. In another exemplary embodiment, the RPIO may be displayed in sub-pennies. In yet another embodiment, no indicator may be provided regarding RPIOs.

The retail customer 220 may place a retail order 224 (e.g., via a website of a broker) for execution on the stock exchange 205. For example, the stock exchange may receive the order in XML format substantially in the following form:

```
<XML>
  <Order>
    <InstrumentType>Equity</InstrumentType>
    <Symbol>XYZ</Symbol>
    <OrderType>Market</OrderType>
    <Side>Sell</Side>
    <TradeSize>1000 Shares</TradeSize>
  </Order>
</XML>
```

The stock exchange may use order allocation data 232 to determine counterparties to the retail order and/or order quantities allocated to various counterparties. For example, order allocation data may include information regarding contra-side RPIOs (e.g., buy orders) placed by RLPs. Such data may be stored in a database table that may include fields such as:

RLP_ID—ID of the RLP that placed an RPIO (e.g., RLP_1)
RPIO_ID—ID of the RPIO (e.g., RPIO_1)
TimePlaced—Time the RPIO was placed (e.g., 20110602-12:10:12)
Symbol—Financial instrument identifier (e.g., XYZ)
Side—RPIO side (e.g., Buy or Sell)
Quantity—RPIO quantity (e.g., 500 Shares)

In another example, order allocation and/or other data about the order may be used to publish information regarding execution quality (EQ).

Figure 3:
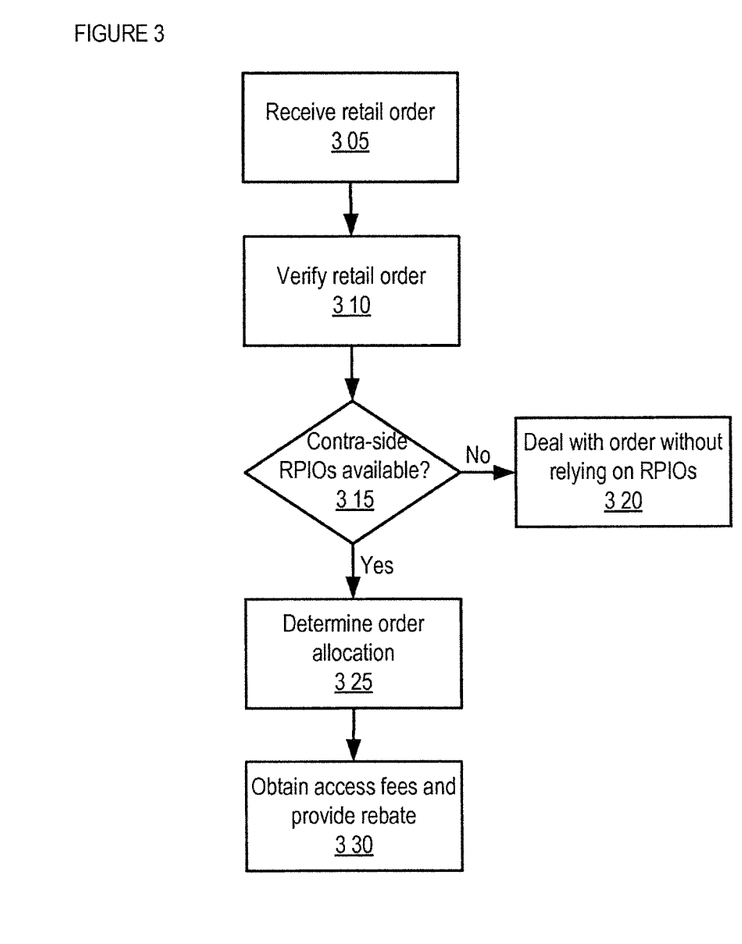
FIG. 3 shows a logic flow diagram illustrating a Retail Order Execution (ROE) component according to one embodiment of the Retail Aggregator.

FIG. 3 shows a logic flow diagram illustrating a Retail Order Execution (ROE) component in one embodiment of the Retail Aggregator. In FIG. 3, a retail order may be received at 305. For example, the retail order may be received from a broker on behalf of a customer, who placed an order via the broker's website. The retail order may be verified at 310 to ensure that it is a legitimate retail order. For example, an order may be considered a retail order if the order: (1) originates from a natural person (e.g., no orders from algorithms), and/or (2) is an agency order that originated as such, is routed through a member organization, and is not changed (e.g., side, cancel, duration) by the routing member, and/or (3) is a proprietary order from a routing member that results from liquidating positions acquired from the internalization of retail orders by that member, and/or (4) is from a member (e.g., a broker) or division of a member that is retail in nature.

In one embodiment, verifying that an order is a retail order may include monitoring orders for specific characteristics (e.g., number of orders per minute, realized spread, average order size, cancellation rate, etc.) and classifying orders as retail or non-retail based on such characteristics (e.g., if the number of orders per minute exceeds a threshold value, such as 30 orders per minute, the order is classified as non-retail, otherwise, the order is classified as retail). In one exemplary embodiment, such monitoring may be done on a real-time basis. In another exemplary embodiment, such monitoring may be based on monitoring over a period of time (e.g., weekly, monthly) and the threshold may be an average (e.g., weekly average, monthly average), a threshold value (e.g., number of orders per minute does not exceed a threshold value during two out of the last three weeks or the orders are classified as non-retail), or any other suitable metric.

In another embodiment, verifying that an order is a retail order may include creating a customer scorecard. The customer scorecard may be updated periodically (e.g., weekly, monthly, or at any other interval). For example such a scorecard may include factors such as buy/sell ratio, average order size, cancellation rate, rapidity of message flow (e.g., number of messages per second, number of take messages per second, or any other suitable message flow metric), alpha (i.e., performance measure adjusted for risk), realized spread, and/or other factors. For example, the value of the realized spread factor may be determined using a trailing weekly and/or daily calculation (e.g., two out of the last three weeks are positive or above a certain number, two out of the last three days are positive or above a certain number, last two weeks average positively, and/or other calculations) to classify a customer as having retail orders. The value of the customer's scorecard may be used to classify orders placed by the customer as retail or non-retail. For example, if at least four out of five factors indicate that the customer's orders are retail orders, the customer's orders may be classified as retail orders.

A determination may be made at 315 whether contra-side RPIOs are available. If contra-side RPIOs are not available, the order may be filled without relying on RPIOs at 320. If contra-side RPIOs are available, order allocation among RLPs may be determined at 325. In one embodiment, competing RPIOs in the same security may be ranked and/or allocated according to price and then time of entry into a stock exchange. For example, if RLP1 enters an RPIO1 to buy stock XYZ at $10.01 for 500, RLP2 enters an RPIO2 to buy stock XYZ at $10.02 for 500, and RLP3 enters an RPIO3 to buy stock XYZ at $10.03 for 500, an incoming retail order to sell 1,000 shares of stock XYZ may execute first against RPIO3, because it is the best-priced bid, then against RPIO2, because it is the next-best-priced bid, and RPIO1 may not be filled because the entire size of the retail order to sell 1,000 would be depleted.

In one exemplary embodiment, the retail order may execute at the price that completes the retail order. For example, if RLP1 enters an RPIO1 to buy stock XYZ at $10.01 for 500, RLP2 enters an RPIO2 to buy stock XYZ at $10.02 for 500, and RLP3 enters an RPIO3 to buy stock XYZ at $10.03 for 500, an order to sell 1,000 shares may execute at $10.02 because it would result in a complete fill. This may be termed the clean-up price, that is, the highest bid or lowest offer among the bids and offers that will result in a complete fill of the offer.

In another exemplary embodiment, the retail order may execute at the price entered by the RLPs. For example, 500 shares may be sold at $10.03 and 500 shares may be sold at $10.02. In another embodiment, RPIOs in the same security may be ranked and/or allocated according to predetermined counterparty rankings. For example, for stock XYZ, RLP2 may be the preferred counterparty, RLP3 may be the second preferred counterparty (e.g., in case there is no counter-side RPIO from RLP2), and RLP1 may be the third preferred counterparty (e.g., in case there is no counter-side RPIO from RLP2 and RLP3). Furthermore, in some embodiments, RLPs may be allowed to pre-select RMOs against which their RPIOs may trade and/or to vary the level of price improvement provided to an RMO (e.g., as long as the level of price improvement is at least the guaranteed level of price improvement).

In another exemplary embodiment, a portion of the retail order may be filled by a displayed or non-displayed exchange order. For example, if RLP1 enters an RPIO1 to buy stock XYZ at $10.01 for 500, a displayed or non-displayed exchange order is entered to buy stock XYZ at $10.02 for 500, and RLP3 enters an RPIO3 to buy stock XYZ at $10.03 for 500, an order to sell 1,000 shares may execute at $10.02, using both the RPIO1 and the displayed or nondisplayed exchange order.

In another exemplary embodiment, an RMO may determine how a retail order interacts with available contra-side interests by designating the order as one of any number of pre-defined retail order types. For example, in one embodiment, an RMO may designate a retail order as being either a type1-designated retail order, a type2-designated retail order, or a type3-designated retail order.

A type1-designated retail order would interact with available contra-side RPIOs within the stock exchange. Any portion of a type-1 designated retail order that does not execute against contra-side RPIOs would be immediately and automatically canceled and would not interact with other available contra-side interest within the stock exchange or be routed to other markets.

A type2-designated retail order would also interact with available contra-side RPIOs in the stock exchange. Any remaining portion of the type2-designated order may interact with other interests in the stock exchange but would not route to other markets. As with the previous types, a type3-designated retail order would interact with available contra-side RPIOs in the stock exchange. Any remaining portion of the retail order that does not execute against contra-side RPIOs may then execute against other interests in the stock exchange, and then route to other markets outside of the stock exchange, if necessary. Any still unexecuted portion would then be immediately and automatically canceled.

In one embodiment, access fees may be charged to RLPs that placed executed RPIOs and/or a rebate may be provided to the customer that placed the retail order (e.g., the rebate may provide an incentive for an RMO to send orders via the Retail Aggregator) at 330. For example, such fees and/or rebates may be calculated on a per share basis (e.g., RLPs may be charged $0.0011 per share, the retail customer may be provided with a rebate of $0.001 per share). In another embodiment, access fees may be charged to the retail customer and/or rebates may be provided to RLPs.

Figure 4:
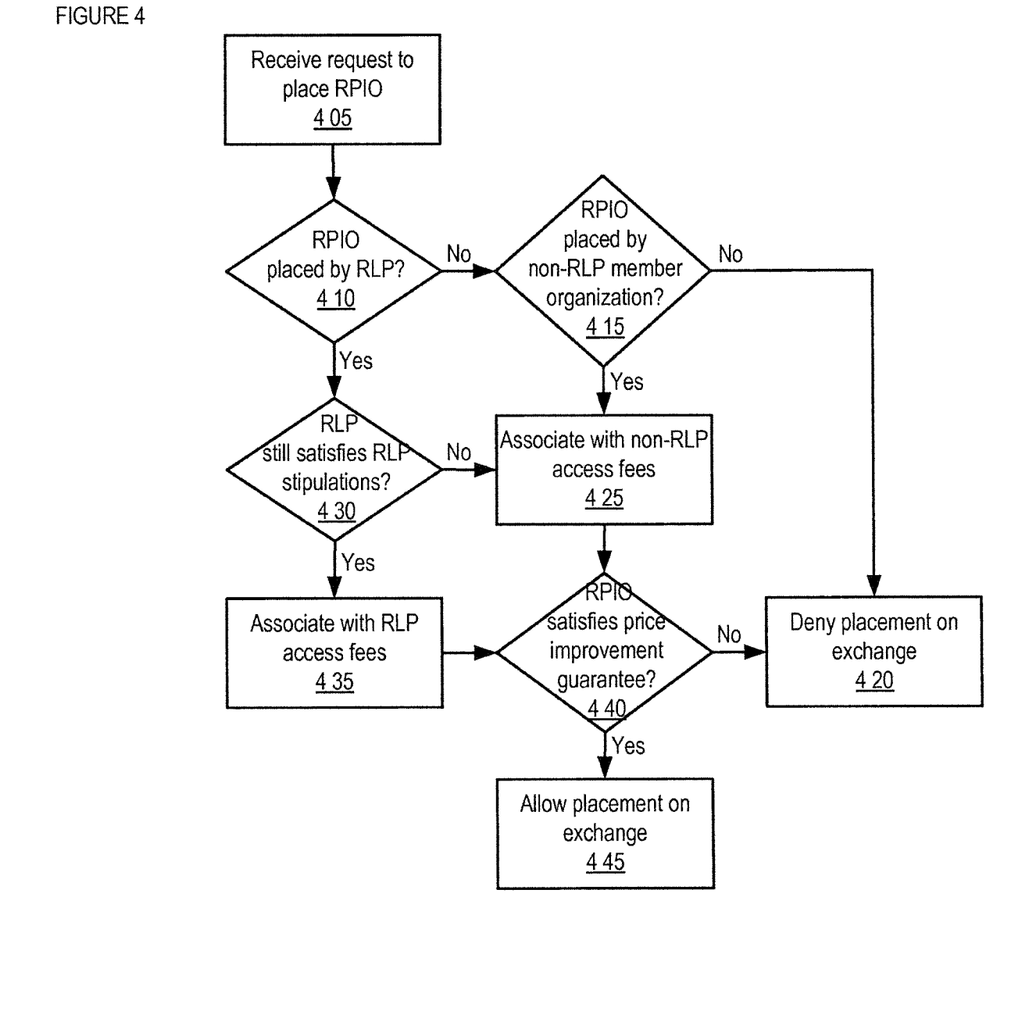
FIG. 4 shows a logic flow diagram illustrating an RPIO Placement (RP) component according to one embodiment of the Retail Aggregator.

FIG. 4 shows a logic flow diagram illustrating an RPIO Placement (RP) component according to one embodiment of the Retail Aggregator. In FIG. 4, an RPIO may be received at 405. For example, the RPIO may be received from an RLP, from a non-RLP member organization, or from any other suitable entity. A determination may be made at 410 whether the RPIO was placed by an RLP. To qualify as an RLP, a member organization may have to satisfy various conditions such as: (1) already be approved as a Designated Market Maker ("DMM") or Supplemental Liquidity Provider ("SLP"), (2) demonstrate an ability to be an RLP, (3) have mnemonics or the ability to accommodate other exchange-supplied designations that identify to the exchange RLP trading activity in assigned RLP securities, (4) have adequate trading infrastructure and technology to support electronic trading, and/or other conditions. In one embodiment, the exchange may approve one or more member organizations to act as an RLP for a particular security. In another exemplary embodiment, the exchange may approve a particular member organization to act as an RLP for one or more securities. For example, approved RLPs may be assigned securities according to requests made to/by, and/or approved by, the exchange.

If the RPIO was not placed by an RLP, a determination may be made at 415 whether the RPIO was placed by a non-RLP member organization. For example, a non-RLP member organization may be allowed to place RPIOs, but under different terms than the RLPs (e.g., higher access fees). If the RPIO was not placed by either an RLP or by a non-RLP member organization, the RPIO may be denied placement on an exchange at 420. If the RPIO was placed by a non-RLP member organization, the order may be associated with a non-RLP access fee (e.g., $0.0021 per share) at 425.

If the RPIO was placed by an RLP, a determination may be made at 430 whether the RLP still satisfies predetermined RLP criteria. For example, to maintain standing as an RLP, the RLP may have to maintain: (1) an RPIO that is better than a benchmark, such as the best protected bid (PBB), for a specified period of the trading day (e.g., at least five percent) for each assigned security, (2) an RPIO that is better than a benchmark, such as the best protected offer (PBO), for a specified period of the trading day (e.g., at least five percent) for each assigned security. In various embodiments, an RLP's five-percent stipulation may be calculated by determining the average percentage of time the RLP maintains an RPIO in each of its RLP securities during the regular trading day, such as on a daily, monthly, or other suitable basis. In various exemplary embodiments, the exchange may determine whether an RLP has met the five-percent stipulation by calculating the following: (1) the "Daily Bid Percentage" may be calculated by determining the percentage of time an RLP maintains an RPIO that is better than the PBB during each trading day for a calendar month, (2) the "Daily Offer Percentage" may be calculated by determining the percentage of time an RLP maintains an RPIO that is better than the PBO during each trading day for a calendar month, (3) the "Monthly Average Bid Percentage" may be calculated for each RLP security by summing the security's "Daily Bid Percentages" for each trading day in a calendar month then dividing the resulting sum by the total number of trading days in such calendar month, (4) the "Monthly Average Offer Percentage" may be calculated for each RLP security by summing the security's "Daily Offer Percentage" for each trading day in a calendar month and then dividing the resulting sum by the total number of trading days in such calendar month, and/or using other suitable methods. If the RLP does not satisfy RLP stipulations, the order may be associated with a non-RLP access fee at 425. If the RLP satisfies RLP criteria, the order may be associated with an RLP access fee (e.g., $0.0011 per share) at 435.

A determination may be made at 440 whether the RPIO satisfies a price improvement guarantee. For example, the exchange may specify that RPIOs may have to have an improved price, for example, relative to some benchmark (e.g., better than the NBBO for a stock by at least $0.001), to qualify as RPIOs. If the RPIO does not satisfy the price improvement guarantee, the RPIO may be denied placement on the exchange at 420. If the RPIO satisfies the price improvement guarantee, the RPIO may be allowed placement on the exchange at 445.

Retail Aggregator Controller

Figure 5:
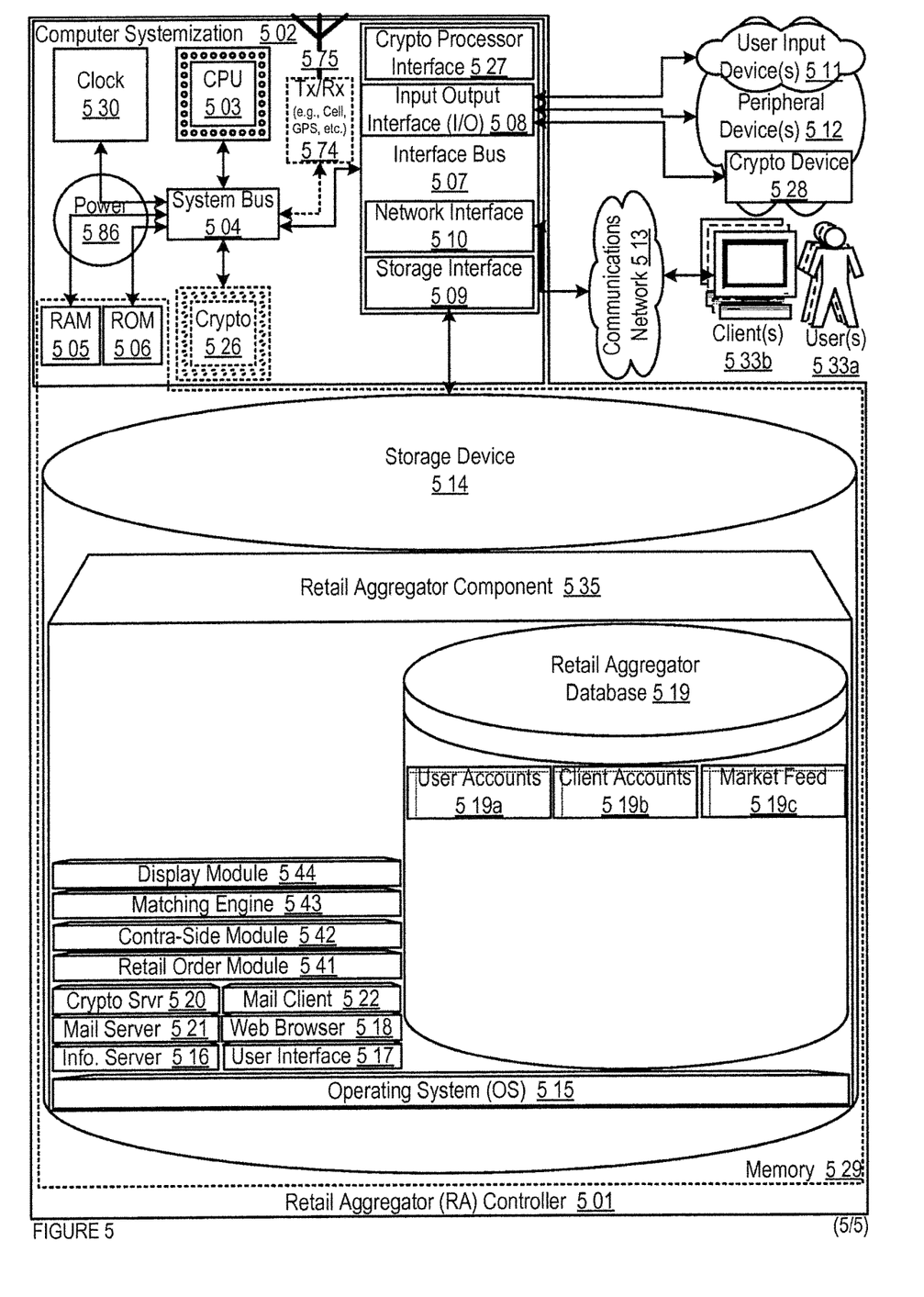
FIG. 5 shows a block diagram illustrating embodiments of a Retail Aggregator controller.

FIG. 5 shows a block diagram illustrating embodiments of a Retail Aggregator controller. In this embodiment, the Retail Aggregator controller 501 may serve to aggregate, process, store, search, serve, identify, instruct, generate, match, and/or facilitate interactions with a computer through information technologies, and/or other related data.

Typically, users, which may be people and/or other systems, may engage information technology systems (e.g., computers) to facilitate information processing. In turn, computers employ processors to process information; such processors 503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the Retail Aggregator controller 501 may be connected to and/or communicate with entities such as, but not limited to: one or more users from user input devices 511; peripheral devices 512; an optional cryptographic processor device 528; and/or a communications network 513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Retail Aggregator controller 501 may be based on computer systems that may comprise, but are not limited to, components such as: a computer systemization 502 connected to memory 529.

Computer Systemization

A computer systemization 502 may comprise a clock 530, central processing unit ("CPU(s)" and/or "processor(s)" (these terms are used interchangeable throughout the disclosure unless noted to the contrary)) 503, a memory 529 (e.g., a read only memory (ROM) 506, a random access memory (RAM) 505, etc.), and/or an interface bus 507, and most frequently, although not necessarily, are all interconnected and/or communicating through a system bus 504 on one or more (mother)board(s) 502 having conductive and/or otherwise transportive circuit pathways through which instructions (e.g., binary encoded signals) may travel to effectuate communications, operations, storage, etc. The computer systemization may be connected to a power source 586; e.g., optionally the power source may be internal. Optionally, a cryptographic processor 526 and/or transceivers (e.g., ICs) 574 may be connected to the system bus. In another embodiment, the cryptographic processor and/or transceivers may be connected as either internal and/or external peripheral devices 512 via the interface bus I/O. In turn, the transceivers may be connected to antenna(s) 575, thereby effectuating wireless transmission and reception of various communication and/or sensor protocols; for example the antenna(s) may connect to: a Texas Instruments WiLink WL1283 transceiver chip (e.g., providing 802.1m, Bluetooth 3.0, FM, global positioning system (UPS) (thereby allowing Retail Aggregator controller to determine its location)); Broadcom BCM4329FKUBG transceiver chip (e.g., providing 802.1m, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the Retail Aggregator controller and beyond through various interfaces. Should processing requirements dictate a greater amount speed and/or capacity, distributed processors (e.g., Distributed Retail Aggregator), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the Retail Aggregator may be achieved by implementing a microcontroller such as CAST's R8051XC2 microcontroller; Intel's MCS 51 (i.e., 8051 microcontroller); and/or the like. Also, to implement certain features of the Retail Aggregator, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the Retail Aggregator component collection (distributed or otherwise) and/or features may be implemented via the microprocessor and/or via embedded components; e.g., via ASIC, coprocessor, DSP, FPGA, and/or the like. Alternately, some implementations of the Retail Aggregator may be implemented with embedded components that are configured and used to achieve a variety of features or signal processing.

Depending on the particular implementation, the embedded components may include software solutions, hardware solutions, and/or some combination of both hardware/software solutions. For example, Retail Aggregator features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the Retail Aggregator features. A hierarchy of programmable interconnects allow logic blocks to be interconnected as needed by the Retail Aggregator system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the Retail Aggregator may be developed on regular FPGAs and then migrated into a fixed version that more resembles ASIC implementations. Alternate or coordinating implementations may migrate Retail Aggregator controller features to a final ASIC instead of or in addition to FPGAs. Depending on the implementation all of the aforementioned embedded components and microprocessors may be considered the "CPU" and/or "processor" for the Retail Aggregator.

Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the Retail Aggregator thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the Retail Aggregator controller is accessible through remote clients 533*b* (e.g., computers with web browsers) by users 533*a*. Network interfaces may employ connection protocols such as, but not limited to: direct connect, Ethernet (thick, thin, twisted pair 10/100/1000 Base T, and/or the like), Token Ring, wireless connection such as IEEE 8o2.11a-x, and/or the like. Should processing requirements dictate a greater amount speed and/or capacity, distributed network controllers (e.g., Distributed Retail Aggregator), architectures may similarly be employed to pool, load balance, and/or otherwise increase the communicative bandwidth required by the Retail Aggregator controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.na/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 511 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 512 may be connected and/or communicate to I/O and/or other facilities of the like such as network interfaces, storage interfaces, directly to the interface bus, system bus, the CPU, and/or the like. Peripheral devices may be external, internal and/or part of the Retail Aggregator controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the Retail Aggregator controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the Retail Aggregator controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the Retail Aggregator controller and/or a computer systemization may employ various forms of memory 529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the Retail Aggregator component(s) 535; and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like.

Operating System

The operating system component 515 is an executable program component facilitating the operation of the Retail Aggregator controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Retail Aggregator controller to communicate with other entities through a communications network 513. Various communication protocols may be used by the Retail Aggregator controller as a subcarrier transport mechanism for interaction, such as, but not limited to: multicast, TCP/IP, UDP, unicast, and/or the like.

Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Retail Aggregator controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Retail Aggregator database 519, operating systems, other program components, user interfaces, Web browsers, and/or the like.

Access to the Retail Aggregator database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Retail Aggregator. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Retail Aggregator as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the Retail Aggregator enabled nodes. The combined application may be nugatory on systems employing standard Web browsers.

Mail Server

A mail server component 521 is a stored program component that is executed by a CPU 503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Retail Aggregator.

Access to the Retail Aggregator mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Retail Aggregator may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the Retail Aggregator component to engage in secure transactions if so desired. The cryptographic component facilitates the secure accessing of resources on the Retail Aggregator and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Retail Aggregator Database

The Retail Aggregator database component 519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Retail Aggregator database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the Retail Aggregator database is implemented as a data-structure, the use of the Retail Aggregator database 519 may be integrated into another component such as the Retail Aggregator component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519a-c. A user accounts table 519a includes fields such as, but not limited to: a user_ID, user Name, and/or the like. The user table may support and/or track multiple entity accounts on a Retail Aggregator. A client accounts table 519b includes fields such as, but not limited to: client_ID, client Name, and/or the like. A market data table 519c includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi.

In one embodiment, the Retail Aggregator database may interact with other database systems. For example, employing a distributed database system, queries and data access by search Retail Aggregator component may treat the combination of the Retail Aggregator database, an integrated data security layer database as a single database entity.

In one embodiment, user programs may contain various user interface primitives, which may serve to update the Retail Aggregator. Also, various accounts may require custom database tables depending upon the environments and the types of clients the Retail Aggregator may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519a-c. The Retail Aggregator may be configured to keep track of various settings, inputs, and parameters via database controllers.

The Retail Aggregator database may communicate to and/or with other components in a component collection, including itself, and/or facilities of the like. Most frequently, the Retail Aggregator database communicates with the Retail Aggregator component, other program components, and/or the like. The database may contain, retain, and provide information regarding other nodes and data.

The Retail Aggregators

The Retail Aggregator component 535 is a stored program component that is executed by a CPU. In one embodiment, the Retail Aggregator component incorporates any and/or all combinations of the aspects of the Retail Aggregator that was discussed in the previous figures. As such, the Retail Aggregator affects accessing, obtaining and the provision of information, services, transactions, and/or the like across various communications networks.

The Retail Aggregator transforms RPIOs and retail order inputs via Retail Aggregator components that may include a retail order module 541, a contra-side module 542, matching engine 543, a display module 544, a Retail Order Execution (ROE) component 545, and a Retail Price Improvement Order (RPIO) Placement component 546.

The Retail Aggregator component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the Retail Aggregator server employs a cryptographic server to encrypt and decrypt communications. The Retail Aggregator component may communicate to and/or with other components in a component collection, including itself, and/or facilities of the like. Most frequently, the Retail Aggregator component communicates with the Retail Aggregator database, operating systems, other program components, and/or the like. The Retail Aggregator may contain, communicate, generate, obtain, and/or provide program component, system, user, and/or data communications, requests, and/or responses.

Distributed Retail Aggregators

The structure and/or operation of any of the Retail Aggregator node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Retail Aggregator controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

*w3c*-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the Retail Aggregator controller may be executing a PHP script implementing a Secure Sockets Layer ("SSL") socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
< ?PHP
header ('Content-Type: text/plain');
// set ip address and port to listen to for incoming data
$address = '192.168.0.100';
$port = 2 55;
// create a server-side SSL socket, listen for/accept
incoming communication
$sock = socket_create (AF_INET, SOCK_STREAM, 0);
socket bind ($sock, $address, $port) or die
('Could not bind to address'); socket_listen
($sock);
$client = socket_accept ($sock);
// read input data from client device in 1024 byte
blocks until end of message
do {
   $input ="";
   $input = socket_read ($client, 1024);
   $data .= $input;
} while($input !="");
// parse data to extract variables
$obj = json_decode ($data, true);
// store input data in a database
mysql_connect ("201.408.185.132",
$DBserver,$password); // access database server
mysql_select ("CLIENT_DB.SQL"); // select database to append
mysql_query ("INSERT INTO UserTable (transmission)
VALUES ($data)"); // add data to UserTable
table in a CLIENT database
mysql_close ("CLIENT_DB.SQL"); //
close connection to database
?>
```

Also, the following resources may be used to provide example embodiments regarding SOAP parser implementation:
   http://www.xay.com/perl/site/lib/SOAP/Parser.html
   http://publib.boulderibm.com/infocenter/tivihelp/v2rl/index.jsp?topic=/com.ibm.IBMDI.doc/
      referenceguide295.htm
   and other parser implementations:
   http://publib.boulder.ibm.com/infocenter/tivihelp/v2rl/index.jsp?topic=/com.ibm.IBMDI.doc/
      referenceguide259.htm
all of which are hereby expressly incorporated by reference.

In order to address various issues and advance the art, the entirety of this application for RETAIL AGGREGATOR APPARATUSES, METHODS, AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a Retail Aggregator individual and/or enterprise user, database configuration and/or relational model, data type, data transmission and/or network framework, syntax structure, and/or the like, various embodiments of the Retail Aggregator, may be implemented that enable a great deal of flexibility and customization. For example, aspects of the Retail Aggregator may be adapted for bonds and derivatives transactions. While various embodiments and discussions of the Retail Aggregator have been directed to financial instrument transactions, however, it is to be understood that the embodiments described herein may be readily configured and/or customized for a wide variety of other applications and/or implementations.

The invention claimed is:

1. A machine-readable, non-transitory tangible medium storing processor-issuable instructions to cause a computer processor to:
   monitor, by a retail aggregator component of said instructions, a plurality of electronic orders from a plurality of external data sources for specific order characteristics, said monitoring occuiTing at least one of in real-time and periodically;
   receive, via at least one of an electronic gateway and an interface, an electronic message comprising an electronic retail order for a security from at least one of said plurality of external data sources;
   analyze, by the retail aggregator component, the electronic retail order and verify that said electronic retail order is an order that is not from a trading algorithm, said analyze step comprising at least one of:
      (a) assess order characteristics within said electronic retail order and determine that said order characteristics do not violate a first threshold, said order characteristics being among the monitored specific order characteristics; and (b) assess characteristics associated with a data source of said electronic message and determine that said characteristics do not violate a second threshold, said data source being among the plurality of external data sources; and fill at least a portion of the electronic retail order via a contra-side non-displayed order once the electronic retail order is verified.

2. The machine-readable, non-transitory tangible medium of claim 1, further storing processor-issuable instructions to cause a computer processor to fill at least one further portion of the electronic retail order at an improved price relative to a benchmark using an existing order other than the contra-side non-displayed order, said existing order comprising at least one of a displayed order on an electronic exchange and a non-displayed order on the electronic exchange.

3. The machine-readable, non-transitory tangible medium of claim 2, further storing processor-issuable instructions to cause the computer processor to fill the electronic retail order using a plurality of orders having at least two different prices, said plurality of orders comprising at least one of the contra-side non-displayed order and an existing order.

4. The machine-readable, non-transitory tangible medium of claim 3, wherein at least one of the contra-side non-displayed order and the existing order is received from at least one of an external data source that qualifies as a retail liquidity provider meeting a set of predetermined criteria and an external data source other than one that qualifies as the retail liquidity provider.

5. The machine-readable, non-transitory tangible medium of claim 1, further comprising machine-readable instructions defining a retail price improvement order (RPIO) placement component to cause a processor to determine whether a contra-side order is available.

6. The machine-readable, non-transitory tangible medium of claim 5, wherein the RPIO placement component causes the contra-side order to be placed on the electronic exchange as the contra-side non-displayed order when the contra-side order comprises the improved price.

7. The machine-readable, non-transitory tangible medium of claim 5, wherein the RPIO placement component causes the contra-side order not to be placed on the electronic exchange when the contra-side order does not comprise the improved price.

8. The machine-readable, non-transitory tangible medium of claim 1, wherein said monitoring is performed in real-time.

9. The machine-readable, non-transitory tangible medium of claim 1, wherein said monitoring is performed in periodically.

10. The machine-readable, non-transitory tangible medium of claim 1, wherein the specific order characteristics comprise at least one of (i) a number of orders per minute, (ii) a realized spread, (iii) an average order size, and (iv) a cancellation rate.

11. The machine-readable, non-transitory tangible medium of claim 1, wherein the characteristics associated with the data source comprise at least one of (i) a buy/sell ratio, (ii) an average order size, (iii) a cancellation rate, (iv) a rapidity of message flow, (v) a performance measure adjusted for risk, and (vi) a realized spread.

12. The machine-readable, non-transitory tangible medium of claim 1, wherein the contra-side non-displayed order comprises an improved price relative to a benchmark, the improved price only being available to fill verified retail orders.

13. The machine-readable, non-transitory tangible medium of claim 1, further storing processor-issuable instructions to cause the computer processor to disqualify any received electronic retail order that is not verified by the retail aggregator component, said disqualifying comprising preventing a fill of said any electronic retail order via the contra-side non-displayed order.

* * * * *